(12) United States Patent
Kosugi

(10) Patent No.: US 8,818,320 B2
(45) Date of Patent: Aug. 26, 2014

(54) RECEIVER WITH DETECTION SIGNAL CORRECTION UNIT

(75) Inventor: Masanori Kosugi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 97 days.

(21) Appl. No.: 13/373,888

(22) Filed: Dec. 5, 2011

(65) Prior Publication Data
US 2012/0083234 A1     Apr. 5, 2012

(30) Foreign Application Priority Data

Dec. 24, 2009  (JP) ................................. 2009-292238
Dec. 7, 2010   (JP) ................................. 2010-272605

(51) Int. Cl.
| | |
|---|---|
| B60C 23/04 | (2006.01) |
| H01Q 1/22 | (2006.01) |
| H01Q 3/24 | (2006.01) |
| H04B 7/08 | (2006.01) |

(52) U.S. Cl.
CPC .......... *H04B 7/0814* (2013.01); *B60C 23/0437* (2013.01); *B60C 23/0444* (2013.01); *H01Q 1/2241* (2013.01); *H01Q 3/24* (2013.01)
USPC .......................... 455/337; 455/67.11; 455/272

(58) Field of Classification Search
USPC ........ 455/334, 337, 339, 63.4, 67.11, 5, 62.1, 455/269, 272, 273, 562
See application file for complete search history.

(56) References Cited

U.S. PATENT DOCUMENTS

| | | | |
|---|---|---|---|
| 6,118,990 A * | 9/2000 | Matsumoto ................. | 455/277.1 |
| 6,947,716 B2 * | 9/2005 | Ono .............................. | 455/273 |
| 8,107,557 B2 * | 1/2012 | Lindenmeier et al. ........ | 375/316 |
| 2002/0013136 A1 * | 1/2002 | Meijer .......................... | 455/272 |
| 2006/0234776 A1 * | 10/2006 | Ishihara et al. ............ | 455/562.1 |
| 2009/0258622 A1 * | 10/2009 | Ruijter ....................... | 455/226.3 |

FOREIGN PATENT DOCUMENTS

| | | |
|---|---|---|
| JP | 6247223 A | 2/1987 |
| JP | H09186637 A | 7/1997 |
| JP | 11-215040 | 6/1999 |
| JP | H11252614 A | 9/1999 |
| JP | 2006148196 A | 6/2006 |
| JP | 2008187293 A | 8/2008 |

OTHER PUBLICATIONS

Office Action for corresponding JP Application No. JP2010272605, dated Dec. 10, 2013; 4 pages. (Non-English language).

* cited by examiner

*Primary Examiner* — Blane J Jackson
(74) *Attorney, Agent, or Firm* — Patterson Thuente Pedersen, P.A.

(57) ABSTRACT

A receiver includes an antenna unit that is able to receive a transmission signal from a subject alternately at different reception levels. A wave detection unit wave-detects the transmission signal to generate a detection signal. The detection signal has a signal level that becomes fixed in accordance with the transmission signal when the antenna unit receives the transmission signal at a reception level greater than or equal to a reception limit, and the signal level of the detection signal becomes non-fixed when the antenna unit receives the transmission signal at a reception level that is less than the reception limit. A correction unit removes, when the detection signal includes a fixed value session and a non-fixed value session, the non-fixed value session and corrects the signal level of the non-fixed value session to a level equivalent to the signal level of a fixed value session.

17 Claims, 11 Drawing Sheets

RECEIVER WITH DETECTION SIGNAL CORRECTION UNIT

CROSS-REFERENCE TO RELATED APPLICATIONS

This application is based upon and claims the benefit of priority from prior Japanese Patent Application No. 2010-272605, filed on Dec. 7, 2010, the entire contents of which are incorporated herein by reference.

BACKGROUND OF THE INVENTION

The present invention relates to a receiver that receives and detects a wireless signal.

An electronic key system known in the art automatically locks or unlocks the doors of a vehicle through wireless communication performed between an electronic key, which is carried by a driver, and the vehicle. A vehicle provided with such an electronic key system normally includes a transmitter, which transmits various wireless signals to the electronic key, and a receiver, which receiving various wireless signals transmitted from the electronic key. Japanese Laid-Open Patent Publication No. 11-215040 describes a receiver that uses a diversity scheme to improve the signal reception condition.

With the diversity scheme, among a plurality of antennas, the one having the best signal reception condition is used to perform communication. As shown in FIG. 1, a receiver employing the diversity scheme includes, for example, two antennas 101 and 102, a distributor 110, a reception circuit 109, an envelope wave detector 105, a signal level detection unit 104, and a control unit 106. The antennas 101 and 102 each output a received signal to the distributor 110. The distributor 110 distributes the received signal to the envelope wave detector 105 and the reception circuit 109. The reception circuit 109 demodulates the received signals from the antennas 101 and 102 to generate a data signal and outputs the data signal to various devices. The envelope wave detector 105 detects the envelope of the signal from each of the antennas 101 and 102. In the envelope detection, the envelope wave detector 105 retrieves only the envelope of the signal. The signal detected by the envelope wave detector 105 is provided to the signal level detection unit 104. The signal level detection unit 104 detects the signal level of the detected signal and provides the detection result to the control unit 106.

The receiver further includes a switching element 108, which selectively connects one of the antennas 101 and 102 to the distributor 110. The control unit 106 switches the antennas 101 and 102 by controlling the switching element 108 during reception of wireless signals. The control unit 106 compares the signal levels of the antennas 101 and 102 detected by the signal level detection unit 104 to determine which one of the antennas 101 and 102 is in a better condition for signal reception. This determination enables the receiver to communicate under a better signal reception condition by using the antenna having the better signal reception condition.

The receiver arranged in the vehicle may perform wireless communication with a device other than the electronic key. An example of such a device is a tire pressure monitoring system (TPMS), which monitors the air pressure of tires of a vehicle. A sensor unit is arranged in each tire of the vehicle including the TPMS to detect the air pressure of the tire. Each sensor unit transmits an air pressure signal including information on the detected air pressure of the tire to the receiver. The amount of information included in the air pressure signal is smaller than the amount of information included in a signal transmitted to lock or unlock the doors. The amount of information of the signal for locking or unlocking the doors is larger because such a signal requires high security. The signal length of the air pressure signal is short. Thus, the transmission of the air pressure signal may be completed within a short period of time. In this case, the transmission of the air pressure signal may be completed when the control unit 106 is still comparing the signal levels of the different antennas detected by the signal level detection unit 104. Also, even if the signal reception condition of the antennas 101 and 102 were to be determined before completion of the transmission of the air pressure signal, only part of the air pressure signal may be received by the antenna having the better signal reception condition. In particular, when one antenna 101 is able to receive a signal and the other antenna 102 is not able to receive a signal, a delay in the switching of the antennas may hinder normal reception of the signal.

As described above, a receiver employing the diversity scheme may not be able to optimize the signal reception condition due to the execution time required for the process of determining the signal reception condition by comparing the signal levels. This problem is not limited to a receiver for a vehicle and may also occur when performing communication with a mobile unit that employs the diversity scheme. The above problem also occurs with a variable directivity antenna, which can switch the antenna directivity, when determining the directivity that obtains an optimum signal reception condition.

SUMMARY OF THE INVENTION

The present invention provides a receiver that optimizes the signal reception condition without having to determine the signal reception condition.

One aspect of the present invention is a receiver including an antenna unit that is able to receive a transmission signal transmitted from a communication subject alternately at a plurality of different reception levels. A wave detection unit wave-detects the transmission signal received by the antenna unit to generate a detection signal. The detection signal has a signal level that becomes a fixed value in accordance with the transmission signal when the antenna unit receives the transmission signal at a reception level that is greater than or equal to a reception limit at which the transmission signal can be normally received. When the antenna unit receives the transmission signal at a reception level that is less than the reception limit, the detection signal has a signal level that becomes a non-fixed value. A correction unit removes, when the detection signal includes a fixed value session and a non-fixed value session, the non-fixed value session and corrects a signal level of the non-fixed value session to a level equivalent to a signal level of the fixed value session adjacent to the non-fixed value session.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE EMBODIMENTS

First Embodiment

A receiver according to a first embodiment used for a vehicle (in-vehicle device 10) including a tire pressure monitoring system (TPMS) will now be described with reference to FIGS. 2 to 6. The structure and the operation of the TPMS will first be described with reference to FIG. 2.

Figure 1:
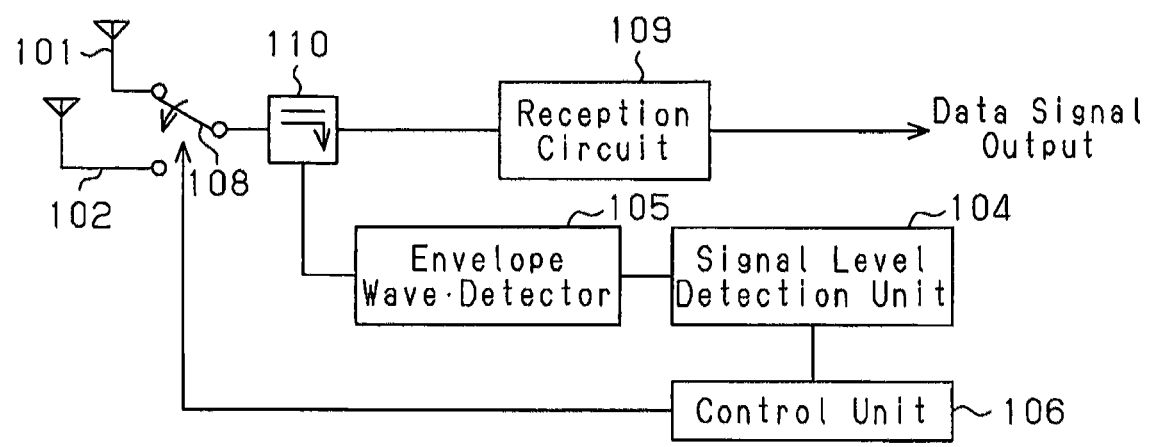
FIG. 1 is a block diagram showing a conventional receiver that determines a signal reception condition.
Figure 2:
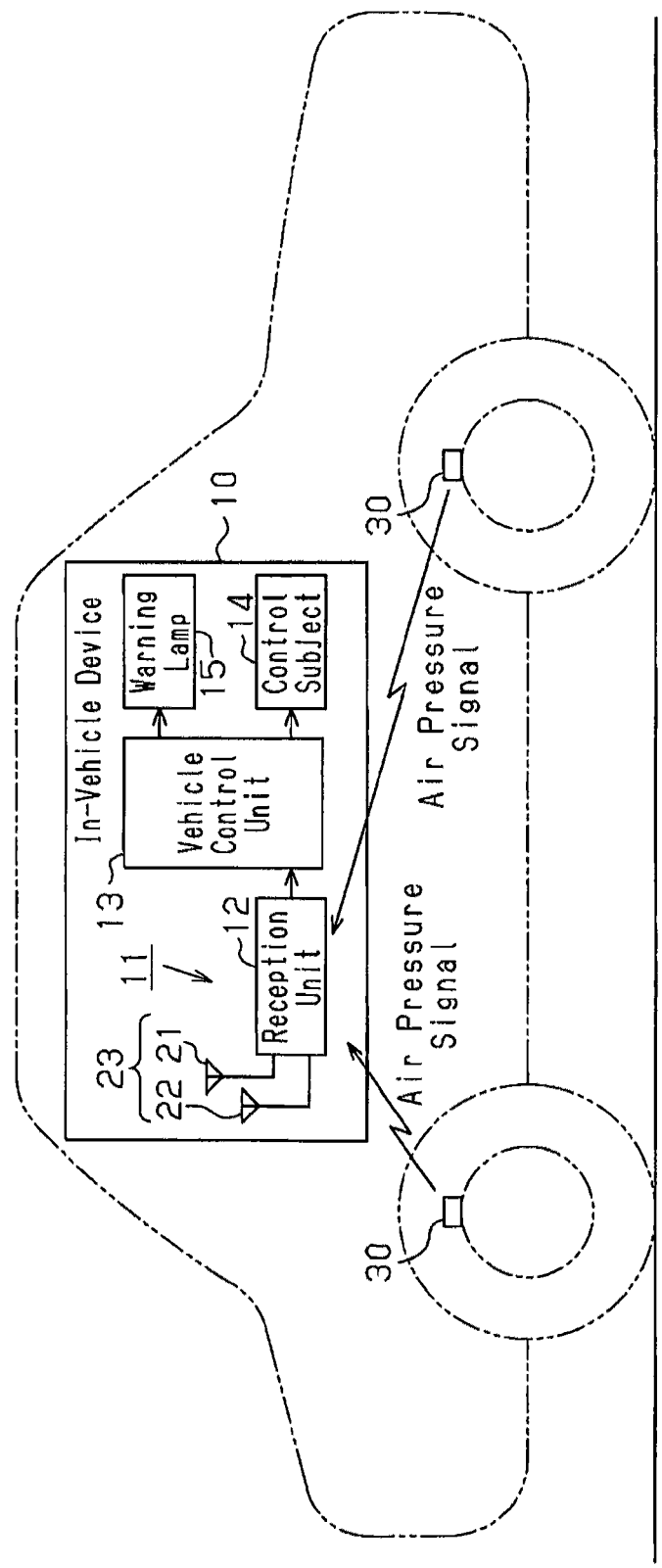
FIG. 2 is a block diagram showing a schematic structure of a TPMS according to a first embodiment.

The TPMS is a system for determining the air pressure of tires when the vehicle is moving. As shown in FIG. 2, a sensor unit 30 is arranged on each tire of the vehicle to detect the air pressure of the tire. Each sensor unit 30 transmits a tire air pressure signal cyclically (e.g., every other minute). The receiver 11 receives the air pressure signal transmitted from each sensor unit 30, wave-detects the air pressure signal, and provides the detection signal to a vehicle control unit 13. The sensor unit 30 is an example of a communication subject. The air pressure signal is an example of a transmission signal.

In the present example, frequency shift keying (FSK) is used as a method for modulating the air pressure signal. With FSK, information is assigned to different frequency elements. For example, 1 (high level) is assigned to a high-frequency element, and 0 (low level) is assigned to a low-frequency element. The receiver 11 wave-detects the air pressure signal modulated by FSK. Through the wave detection of the air pressure signal, the vehicle control unit 13 obtains information carried by the air pressure signal, that is, the air pressure of each tire. The wave detection method will be described in detail later. When determining that the air pressure of a tire is abnormal, the vehicle control unit 13 notifies the driver of the abnormality of the tire air pressure by, for example, lighting a warning lamp 15 arranged near the driver's seat. The vehicle control unit 13 controls a control subject 14.

The structure and the operation of the receiver 11 will now be described with reference to FIG. 3.

Figure 3:
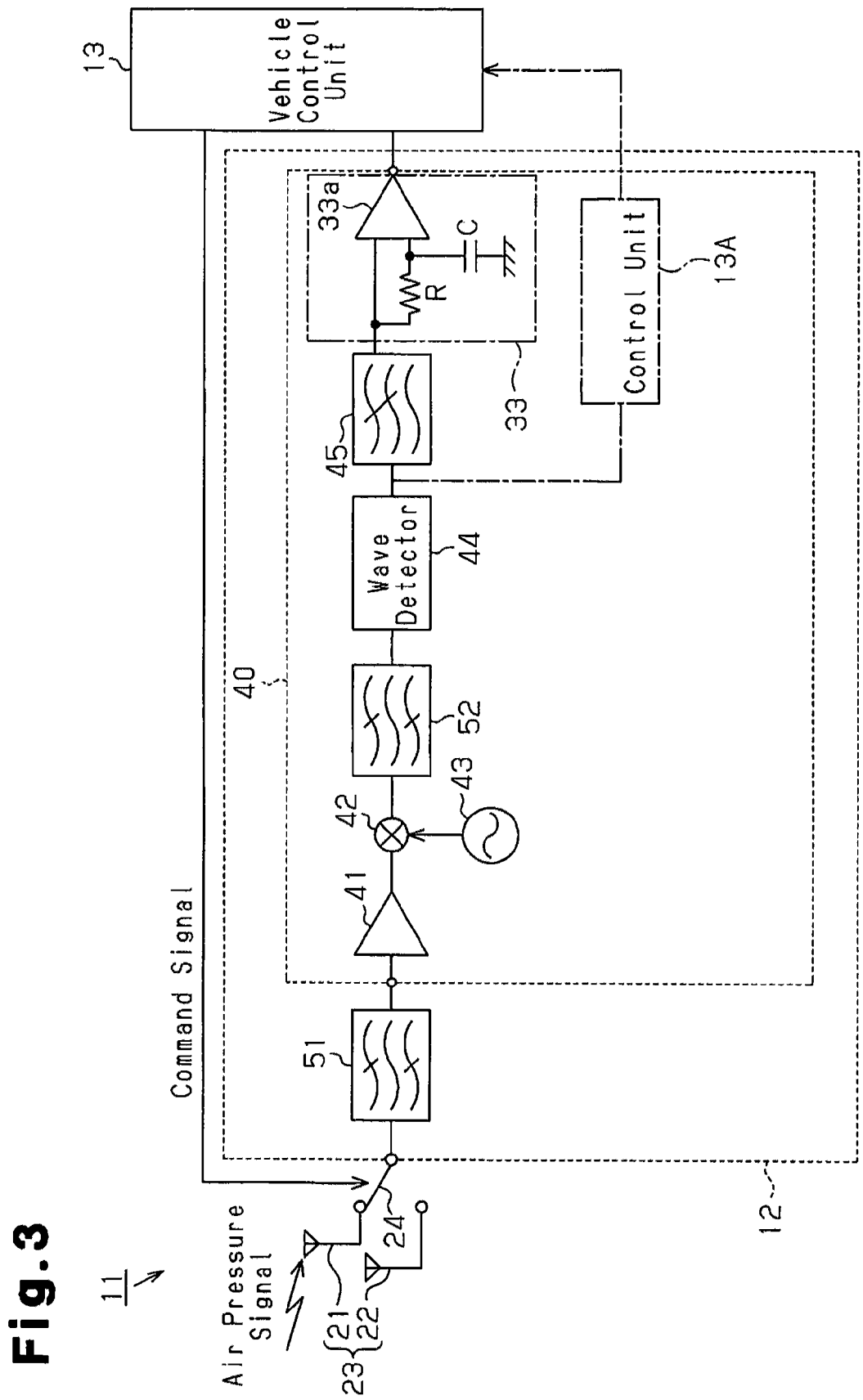
FIG. 3 is a block diagram showing a schematic structure of a receiver according to the first embodiment.

As shown in FIG. 3, the receiver 11 includes an antenna unit 23 and a reception unit 12. The antenna unit 23 includes a first antenna 21 and a second antenna 22, each of which receives the air pressure signal. The reception unit 12 includes a wave detection unit 40 that wave-detects the air pressure signal received by the antenna unit 23. A bandpass filter 51 is arranged between the antenna unit 23 and the wave detection unit 40. Among wireless signals received via the antenna unit 23, the bandpass filter 51 selectively allows passage of a wireless signal having a frequency corresponding to the frequency of the air pressure signal. More specifically, the bandpass filter 51 may remove undesirable noise signals having frequencies greatly differing from the frequency of the air pressure signal. The first antenna 21 and the second antenna 22 are spaced apart from each other in a manner that these antennas can receive a wireless signal at different reception levels. The antenna unit 23 is an example of a variable directivity antenna unit.

A switching element 24 is arranged between the antenna unit 23 and the bandpass filter 51. The switching element 24 selectively connects the antenna 21 or the antenna 22 to the bandpass filter 51 in accordance with a command signal transmitted from the vehicle control unit 13. The time interval at which the antennas 22 and 21 are switched is fixed at a constant value independently of the reception level of the signal. Each of the antennas 21 and 22 can receive the air pressure signal when connected to the bandpass filter 51. Thus, one of the antenna 21 and the antenna 22 is selectively set to a state in which signals are receivable. The vehicle control unit 13 switches the antennas 21 and 22 at a high speed via the switching element 24. In the present example, the antennas 21 and 22 are switched to a signal-receivable state in intervals of 0.1 ms. In other words, the antennas 21 and 22 are switched at the time interval of 0.1 ms. In the present example, the communication rate is 1 kilo bit per second (kbps). In this case, 1 bit of information is transmitted every 1 ms. The switching interval of the antennas 21 and 22 is one tenth of the time required to receive a bit unit of information. The time required to receive a bit unit of information is proportional to the inverse of the communication rate. Thus, the antennas 21 and 22 are switched at a higher speed as the time required to receive a bit unit of information becomes shorter. The switching interval of the antennas 21 and 22 may be set to be extremely short. For example, the switching interval of the antennas 21 and 22 may be set freely within a range of about a few tenths to a hundredth of the time required to receive a bit unit of information.

Figure 6A:
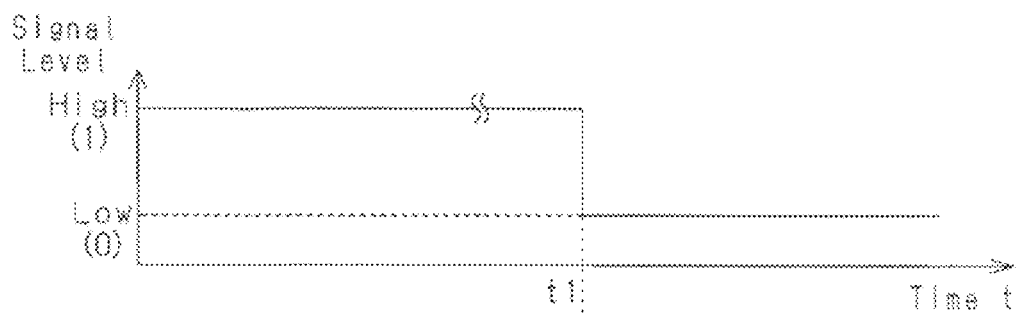
FIG. 6A is a graph showing the signal level of a detection signal in the first embodiment.

The air pressure signal that has passed through the bandpass filter 51 is wave-detected by the wave detection unit 40. More specifically, as shown in FIG. 3, the air pressure signal is first amplified by an amplifier 41. The amplified signal is input to a mixer 42 and mixed with a signal having a frequency f1, which is generated by a local oscillator 43. The frequency of the air pressure signal is fra. In this case, the frequency of the signal amplified by the amplifier 41 is converted to a frequency of fra±f1, which is an intermediate frequency (IF). The resulting signal having the intermediate frequency passes through a bandpass filter 52, which is arranged subsequent to the mixer 42. The bandpass filter 52 filters the signal having the intermediate frequency, which is generated by the mixer 42, and selectively allows passage of a signal having a high frequency (corresponding to the above frequency of fra+f1) or a signal having a low frequency (corresponding to the above frequency of fra−f1). The filtered signal (IF signal) is input to a wave detector 44 and wave-detected. For example, the wave detector 44 includes a quadrature wave detection circuit (not shown) to perform quadrature wave detection. The wave detector 44 detects two voltage levels, which are a high voltage level and a low voltage level, in accordance with the frequency of an analog input signal. In the present example, the signal is modulated by FSK. In this case, the wave detector 44 detects a high frequency as the high voltage level and detects a low frequency as the low voltage level. When the reception level of the signal from the bandpass filter 52 is less than or equal to a predetermined value, the wave detector 44 does not wave-detect the signal. In this case, the wave detector 44 outputs non-fixed values with a wide bandwidth including frequency elements near the two voltage levels. In other words, the wave detector 44 outputs noise. The signal output from the wave detector 44 is then provided to a comparator 33 via a low-pass filter 45. As shown in FIG. 6A, the comparator 33 generates a digital signal indicating "0", which corresponds to the low voltage level, or generates a digital signal indicating "1", which corresponds to the high voltage level. The present example uses the non-return-to-zero (NRZ) method for coding the high voltage level using "1" and the low voltage level using "0".

As described above, FSK, which allocates information to each frequency element, is used to modulate the air pressure signal. Although the signal reception level is changed by switching the antennas 21 and 22, the frequency of the signal remains unchanged as long as the signal reception level is greater than or equal to a reception limit Lim. Thus, the change in the signal reception level caused by the antenna switching does not affect the wave detection and communication.

As shown in FIG. 3, the air pressure signal wave-detected by the wave detector 44 (hereafter referred to as the detection signal) is output to the low-pass filter 45. The low-pass filter 45 filters the detection signal and selectively allows passage of a low-frequency signal. In other words, the low-pass filter 45 removes the high-frequency element from the detection signal. As will be described later in detail, the passage of the detection signal through the low-pass filter 45 obtains the waveform of the signal received via one of the antennas 21 and 22 under the best reception signal condition. The cut-off frequency of the low-pass filter 45 is determined to allow passage of a normal wave-detected signal through the filter 45 to remove a high-frequency element in a non-fixed value session T2 (refer to FIG. 6B). When the communication rate is 1 kbps as described above, 1 bit of information is transmitted every 1 ms of the detection signal. Thus, when the detection signal includes repeated values of 1 and 0, the detection signal contains a frequency element that occurs in cycles of ms. In other words, the detection signal contains a frequency element of 0.5 kHz, which is calculated from the inverse of 2 ms. In this case, the cut-off frequency of the low-pass filter 45 is set to a value that is greater than the frequency element of 0.5 kHz contained in a normal detection signal. For example, the cut-off frequency of the low-pass filter 45 may be set to 1 kHz or higher.

The switching interval of the antennas is set within a range of a few tenths to one hundredth of the time required to receive a bit unit of information for the reasons below. When the antenna switching interval is too short, the non-fixed value sessions T2 of the signal (detection signal elements having non-fixed values) may not be removed by a sufficient degree through the signal filtering. In this case, the detection signal may be recognized in an abnormal manner. When the antenna switching interval is too long, the non-fixed value sessions T2 (detection signal elements having non-fixed values) and the fixed value sessions T1 (detection signal elements having fixed values) may not be correctly distinguished. In this case, the signal elements corresponding to both of the sessions T1 and T2 are removed through the signal filtering. In any of these two cases, the output signals from the low-pass filter 45 would not be correctly compared by the comparator 33.

The comparator 33 compares the signal level of the air pressure signal that has passed through the low-pass filter 45 with a threshold Vr and binarizes the air pressure signal. More specifically, when the signal level is greater than or equal to the threshold Vr, the comparator 33 outputs a signal indicating "1" (high (H) level). When the signal level is less than the threshold Vr, the comparator 33 outputs a signal indicating "0" (low (L) level). The binary air pressure signal generated by the comparator 33 is then provided to the vehicle control unit 13. The air pressure signal is a digital signal that is a combination of 0 and 1. Information related to the air pressure of each tire is obtained by reading the combination of 0 (zeros) and 1 (ones). The vehicle control unit 13 determines whether the air pressure of each tire is normal based on the air pressure signal provided from the comparator 33 and lights a warning lamp 15 when necessary.

A method for correcting the waveform of the signal level through the low-pass filter 45 will now be described in detail.

As described above, the receiver 11 includes the two antennas 21 and 22. Depending on the incoming state of the air pressure signal, the air pressure signal may be receivable by one of the antennas 21 and 22 but not the other. An example of such a situation will now be described in detail.

Figure 4:
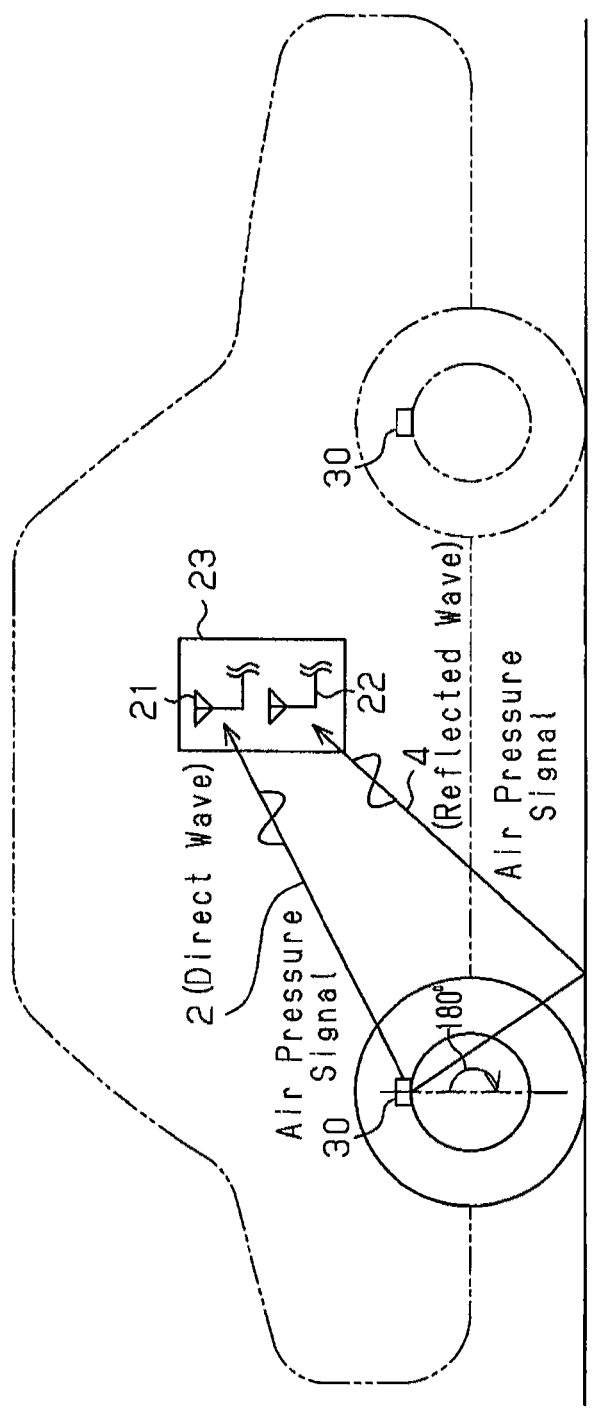
FIG. 4 is a diagram schematically showing transmission of a signal from a sensor unit to two antennas in the first embodiment.
Figure 5:
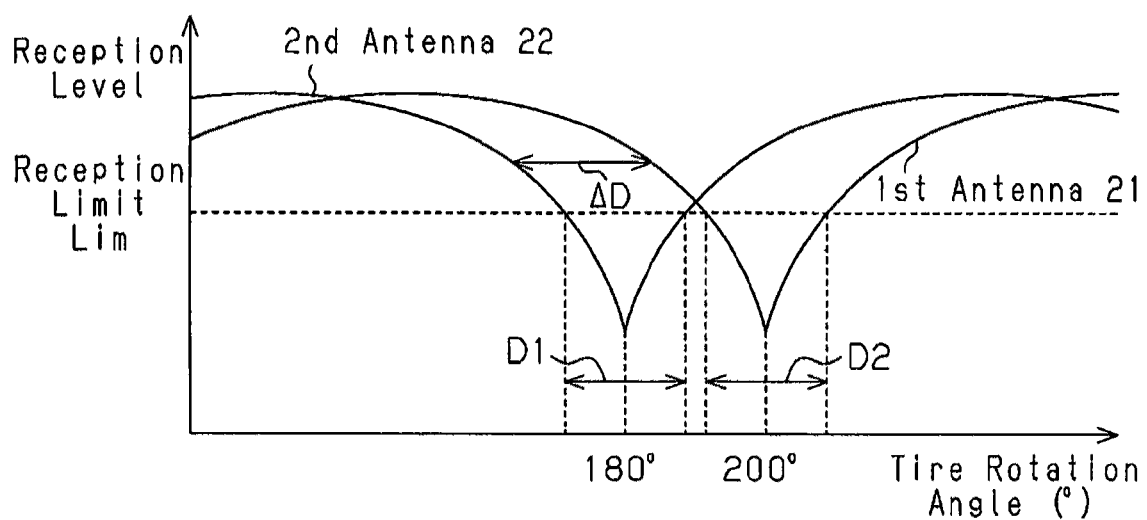
FIG. 5 is a graph showing the reception level of a signal received by two antennas for a tire rotation angle in the first embodiment.

As shown in FIG. 4, the air pressure signal transmitted from the sensor unit 30 travels through the air while maintaining isotropy. As indicated by an arrow 2, for example, the air pressure signal travels from the sensor unit 30 toward the antenna unit 23 as a direct wave. Further, as indicated by an arrow 4, the air pressure signal also travels from the sensor unit 30 to the ground where it is reflected toward the antenna unit 23. The sensor unit 30, which is arranged on the tire, rotates together with the tire when the vehicle is moving. The relationship between the distance from the sensor unit 30 to the antenna unit 23 (indicated by the arrow 2) and the distance from the sensor unit 30 to the antenna unit 23 after the reflection at the ground (indicated by the arrow 4) changes in accordance with the rotation angle of the tire. In other words, the relationship between the phase of the direct wave traveling through the path indicated by the arrow 2 and the phase of the reflected wave traveling through the path indicated by the arrow 4 changes in accordance with the rotation angle of the tire. When, for example, the two signals traveling through the different paths indicated by the arrows 2 and 4 (the direct wave and the reflected wave) have a phase difference of 180 degrees, these two signals interfere with each other. In this case, the antennas would receive the signal at extremely small reception levels. In particular, when the reception levels of the two signals are the same, the two signals interfere with each other to cause their reception levels to be zero. In contrast, when the two signals have the same phase, the reception levels of these signals will be large. FIG. 5 shows the relationship between the tire rotation angle and the reception level of the air pressure signal received by each of the antennas 21 and 22. The graph in FIG. 5 shows the reception level of the signal assumed to be in an ideal state without any obstructions to the signal. As shown in FIG. 5, the reception limit Lim is set as the minimum signal reception level at which the air pressure signal can be received in a normal manner. The first antenna 21 and the second antenna 22 are spaced apart from each other. Thus, the reception level corresponding to the tire rotation angle differs between the antennas 21 and 22. In a system using an ultrahigh frequency (UHF) bandwidth, the antennas 21 and 22 are only required to be spaced apart from each other by a little more than ten centimeters and may be mounted on the same substrate. When the antennas 21 and 22 have different directivities, the antennas 21 and 22 may be spaced by even a shorter interval. As shown in FIG. 5, the types (directivities) of the antennas 21 and 22 and the spacing between the antennas 21 and 22 should be determined in accordance with a difference ΔD between the reception levels of the antennas 21 and 22.

As shown in FIG. 5, an angle range D1 is a range in which the reception level of the signal received by the second antenna 22 is smaller than the reception limit Lim. An angle range D2 is a range in which the reception level of the signal received by the first antenna 21 is smaller than the reception limit Lim. In the present example, the angle range D1 is set in a manner that the tire rotation angle of 180 degrees is its center value, and the angle range D2 is set in a manner that the tire rotation angle of 200 degrees is its center value. In the angle ranges D1 and D2, the reception level of the signal received by one of the antennas 21 and 22 is less than the reception limit Lim, and the reception level of the signal received by the other one of the antennas 21 and 22 is equal to or greater than the reception limit Lim.

Figure 6B:
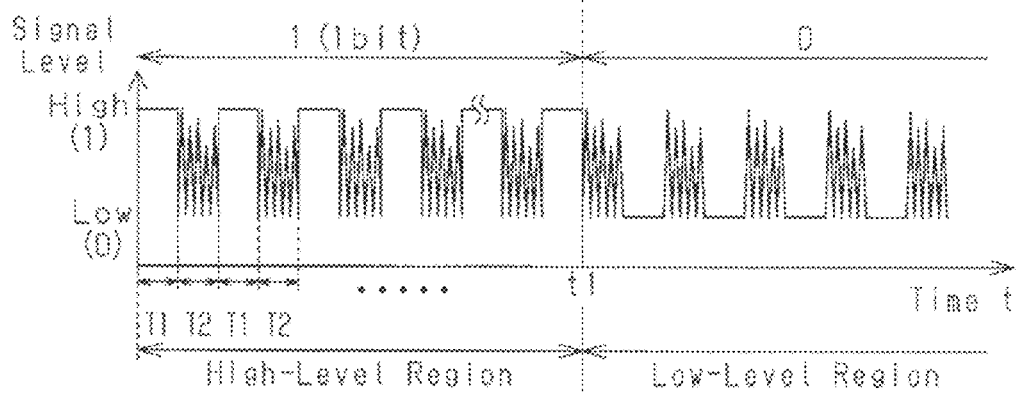
FIG. 6B is a graph showing the signal level of a detection signal including fixed value sessions and non-fixed value sessions in a time sequence.

As shown in FIG. 6B, when the wave detector 44 wave-detects the air pressure signal within the angle range D1, the detection signal has the signal level (the voltage level) including repeated fixed value sessions T1 and non-fixed value sessions T2 in a time sequence. The fixed value sessions T1 of the detection signal are signal elements received by the first antenna 21, whereas the non-fixed value sessions T2 of the detection signal are signal elements received by the second antenna 22. In this case, the switching interval of the antennas 21 and 22 is the time corresponding to a duration time of each fixed value session T1 and each non-fixed value session T2, which is 0.1 ms in the present example. When each of the antennas 21 and 22 receives the signal at a level greater than or equal to the reception limit Lim, as shown in FIG. 6A, the detection signal has an H level (high-voltage level) within a high-level region ending at timing t1, and has an L level (a low-voltage level) within a low-level region starting from timing t1. In the same manner, as shown in FIG. 6B, the fixed value sessions T1 (of the detection signal) have an H level within the high-level region ending at timing t1 and an L level within the low-level region starting from timing t1.

Figure 6C:
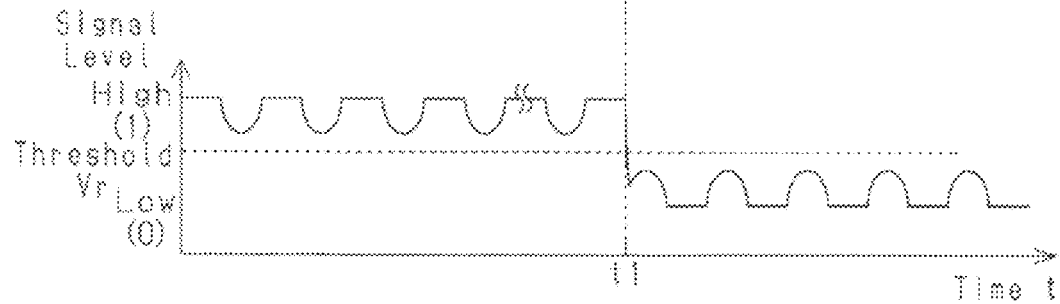
FIG. 6C is a graph showing the waveform of the detection signal shown in FIG. 6B from which high-frequency elements are removed.

The reception signal corresponding to the non-fixed value sessions T2 contain noise. Thus, the signal level of the non-fixed value sessions T2 fluctuates between the H level and the L level. As a result, the non-fixed value sessions T2 of the detection signal have high frequencies. The detection signal having the waveform shown in FIG. 6B is processed through the low-pass filter 45 to remove the high-frequency elements from the detection signal. Through the signal filtering, the signal level of the detection signal will be shaped in a manner that the non-fixed value sessions T2 form recessed parts in the high-level region and form protruded parts in the low-level region as shown in FIG. 6C. The signal level of the detection signal is shaped in this manner because the signal level of the non-fixed value sessions T2 is affected by the signal level of their adjacent fixed value sessions T1 when the high-frequency element is removed from the detection signal. As a result, the signal level of the non-fixed value sessions T2 approaches the signal level of the adjacent fixed value sessions T1. The low-pass filter 45 is an example of a correction unit.

However, the detection signal that has simply passed through the low-pass filter 45 has non-fixed value sessions T2 forming recessed parts or protruded parts and thus does not have a complete H level or L level at the non-fixed value sessions T2. The comparator 33 compares the signal level of the detection signal that has passed through the low-pass filter 45 with the threshold Vr and binarizes the signal level of the detection signal. As shown in FIG. 3, the comparator 33 includes a comparator 33*a*, a resistor R, and a capacitor C. An output signal from the low-pass filter 45 is directly input to one input terminal of the comparator 33*a*. The resistor R is connected to a line connecting the other input terminal of the comparator 33*a* and the low-pass filter 45. The capacitor C connected to ground is connected to a node between the resistor R and the comparator 33*a*. The threshold Vr is determined based on the resistance value of the resistor R and the capacitance value of the capacitor C.

As described above, the antennas 21 and 22 are switched at a high speed. In this case, the fixed value sessions T1 and the non-fixed value sessions T2 are repeated in short cycles. Thus, the non-fixed value sessions T2 are not long enough to cause the signal level of the recessed and protruded parts, which are formed in the non-fixed value sessions T2, to exceed the threshold Vr. In other words, the switching interval of the antennas 21 and 22 is set to be short so that the signal level of the non-fixed value sessions T2 (of the detection signal) obtained as the output signal from the low-pass filter 45 will not exceed the threshold Vr. In the present example, the antennas 21 and 22 are switched at a high speed in a manner that the ratio of the fixed value sessions T1 and the non-fixed value sessions T2 will be 1:1. Thus, unlike a structure in which three or more antennas are switched at a high speed, the fixed value sessions T1 will remain shorter than the non-fixed value sessions T2. As a result, the signal level of the recessed and protruded parts formed in the non-fixed value sessions T2 does not exceed the threshold Vr.

The threshold Vr is set at a value between the H level and the L level by repeatedly charging and discharging the capacitor C in accordance with a signal between the H level and the L level which is output from the low-pass filter 45. As shown in FIG. 6C, the comparator 33 determines that the signal level greater than or equal to the threshold Vr has an H level, and the signal level less than the threshold Vr has an L level. The resulting waveform is the same as the waveform of the signal received by the antennas 21 and 22 at a signal level greater than or equal to the reception limit Lim as shown in FIG. 6A. In the angle range D2, the fixed value sessions T1 and the non-fixed value sessions T2 are located at positions opposite to the positions in the waveform shown in FIG. 6B. The signal level of the detection signal in this angle range D2 can also be corrected in the same manner as described above.

As described above, the signal level can be corrected by processing the signal through the low-pass filter 45. Such correction obtains a waveform that is the same as that obtained by one of the antennas 21 and 22 in the best signal reception condition. In other words, this method has the same advantages as the diversity scheme described with the above conventional technique, while eliminating the need to determine which one of the two antennas is in the better signal reception condition. The method can be applied to signals having a short signal length, such as the air pressure signal, and has the above advantages since the method eliminates the time required to determine the signal reception condition.

The air pressure signal is not continuously transmitted. The air pressure signal can be transmitted, for example, once per minute. If the switching to an optimum antenna cannot be completed during the reception of the air pressure signal under the diversity scheme described above with the conventional technique, the receiver would need to wait for another air pressure signal to be transmitted after switching to the optimum antenna. The tire including the sensor unit 30 is rotating. Determining the optimum antenna at this timing would be meaningless because the antenna determined to be optimum at this timing could be no longer optimum by the time when the next air pressure signal is transmitted. In the present embodiment, the antenna that can receive signals is switched between the antennas 21 and 22 at a high speed independently of, for example, the rotation of the tires. This obtains the same waveform as when the antenna in the best signal reception condition is used. The method of the present embodiment further eliminates the need for the signal level detection unit required under the diversity scheme and simplifies the structure of the receiver 11. Further, the method of the present embodiment eliminates the need for the determination of the optimum antenna performed by the control unit based on an output signal from the signal level detection unit.

The first embodiment has the advantages described below.

(1) When the receiver 11 receives a signal having a reception level greater than or equal to the reception limit Lim, the signal level of its detection signal will have fixed values determined in accordance with the transmission signal. When the reception level is less than the reception limit Lim, the signal level of the detection signal will not be fixed. When the detection signal includes the fixed value sessions T1 and the non-fixed value sessions T2, the non-fixed value sessions T2 are removed, and the signal level of the non-fixed value sessions T2 is corrected to a signal level equivalent to the signal level of the fixed value sessions T1 adjacent to the non-fixed value sessions T2. More specifically, the signal level including non-fixed values is corrected to the signal level including fixed values determined in accordance with the transmission signal (e.g., the air pressure signal). Without requiring any determination associated with the signal reception condition, a signal that is received and wave-detected by the antenna in the best signal reception condition, that is, a wave-detected signal similar to a signal in a fixed value session T1 is obtained.

(2) The non-fixed value sessions T2 are removed when the detection signal is processed by the low-pass filter 45. The non-fixed value sessions T2 contain larger noise than the fixed value sessions T1. Thus, the frequency of the non-fixed value sessions T2 is higher than the frequency of the fixed value sessions T1. Passage of the detection signal including the non-fixed value sessions T2 and the fixed value sessions T1 through the low-pass filter 45 removes the high-frequency element of the non-fixed value sessions T2. The antennas 21 and 22 are switched at a high speed so that the antennas 21 and 22 can alternately receive signals. Namely, the non-fixed value sessions T2 and the fixed value sessions T1 are repeated in short cycles. In this case, the signal level of the non-fixed value sessions T2 is affected by the signal level of their adjacent fixed value sessions T1 when the high-frequency element is removed. As a result, the signal level of the non-fixed value sessions T2 is corrected toward the signal level of the fixed value sessions T1. This method enables the same detection signal to be obtained as obtained in a good signal reception condition, without requiring any determination associated with the signal reception condition.

Second Embodiment

A receiver 11 according to a second embodiment used for a vehicle including a TPMS will now be described with reference to FIGS. 7A to 7C. The receiver 11 according to the second embodiment differs from the receiver 11 according to the first embodiment in the method for removing the non-fixed value sessions T2 of the detection signal (the detection signal elements having non-fixed values). The receiver 11 of the second embodiment has the same structure as the receiver 11 of the first embodiment except that the low-pass filter 45 and the comparator 33 are eliminated from the reception unit 12 (the wave detection unit 40) shown in FIG. 3. The receiver 11 of the second embodiment corrects the signal level of the non-fixed value sessions T2 by using the vehicle control unit 13 that serves as a correction unit. The receiver 11 of the second embodiment may include a control unit 13A having the correction function (i.e., the correction unit) of the vehicle control unit 13. The second embodiment will be described focusing on the differences from the first embodiment.

The vehicle control unit 13 samples the signal level of the detection signal. As described with reference to FIG. 5 in the first embodiment, in the angle range D1, the first antenna 21 receives the signal at the reception level greater than or equal to the reception limit Lim and the second antenna 22 receives the signal at the reception level less than the reception limit Lim. In this case, the detection signal includes the fixed value sessions T1 and the non-fixed value sessions T2, which are arranged alternately as shown in FIG. 7A. In the second embodiment, the switching interval of the antennas 21 and 22 should be at least longer than the time required to receive a bit unit of information. Namely, the second embodiment does not require the switching of the antennas 21 and 22 to be performed at a speed as high as the antenna switching speed required in the first embodiment.

Figure 7A:
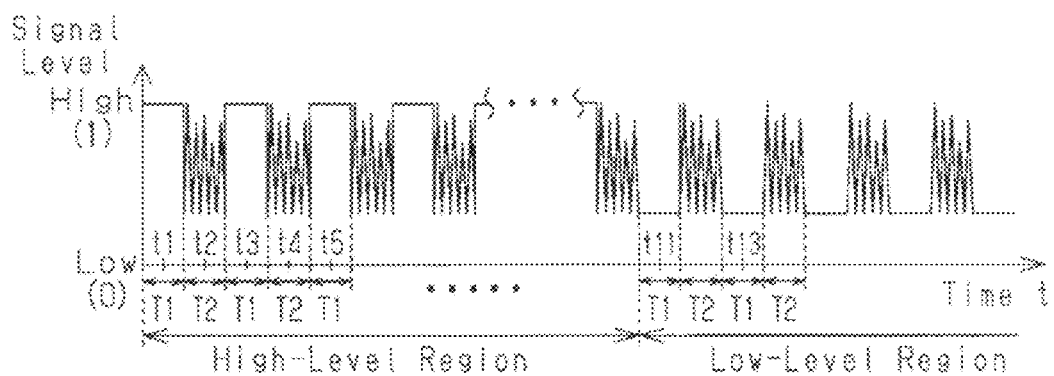
FIG. 7A is a graph showing the signal level of a detection signal including fixed value sessions and non-fixed value sessions according to a second embodiment.

In FIG. 7A, the vehicle control unit 13 that receives the detection signal from the wave detector 44 measures the signal level of the fixed value sessions T1 at timing t1 and measures the signal level of the non-fixed value sessions T2 at timing t2. The vehicle control unit 13 measures the signal level of the detection signal at timings subsequent to timing t3 and t4 in the same manner. The vehicle control unit 13 switches the antennas 21 and 22 using the switching element 24 so that the antennas 21 and 22 can alternately receive signals. Thus, the vehicle control unit 13 recognizes which antenna is being used in each period.

At timing tn (n is a natural number) in which n is an odd number, such as at timing t1 or timing t3, the signal level of the signal received and wave-detected by the first antenna 21 is measured. In this case, the vehicle control unit 13 recognizes the waveform based on the signal level of the signal received and wave-detected by the first antenna 21 at timing tn (n is an odd number) as shown in FIG. 7B. As shown in FIG.

7B, the signal level is determined to have an H level in the high-level region and an L level in the low-level region.

At timing tn in which n is an even number, such as at timing t2 or timing t4, the signal level of the signal received and wave-detected by the second antenna 22 is measured. In this case, the vehicle control unit 13 recognizes the waveform based on the signal level of the signal received and wave-detected by the second antenna 22 at timing tn (n is an even number) as shown in FIG. 7C. As described above, in the angle range D1, the reception level of the signal received by the second antenna 22 is less than the reception limit Lim. At timing tn (n is an even number), the signal level of the non-fixed value sessions T2 is measured. In the non-fixed value sessions T2, the signal level changes randomly between the H level and the L level. The measured value of the signal level in the non-fixed value sessions T2 also changes randomly between the H level and the L level. Thus, the signal level is determined as the H level or the L level in an irregular manner. The vehicle control unit 13 includes a memory (not shown) that stores the threshold Vr used by the comparator 33 in the first embodiment. The vehicle control unit 13 determines that the signal level has an H level when the signal level is greater than or equal to the threshold Vr and an L level when the signal level is less than the threshold Vr at timing tn (n is an even number).

The vehicle control unit 13 determines the validity of the signal based on the signal level measured up to, for example, three times. In the present example, the initial part of the air pressure signal has an H level. When the antennas 21 and 22 receive a signal at a reception level greater than or equal to the reception limit Lim, the signal level would be determined as an H level in at least any measurement performed up to three times. In this case, the vehicle control unit 13 subsequently continues to sample the signal received and wave-detected by the antennas 21 and 22.

Figure 7B:
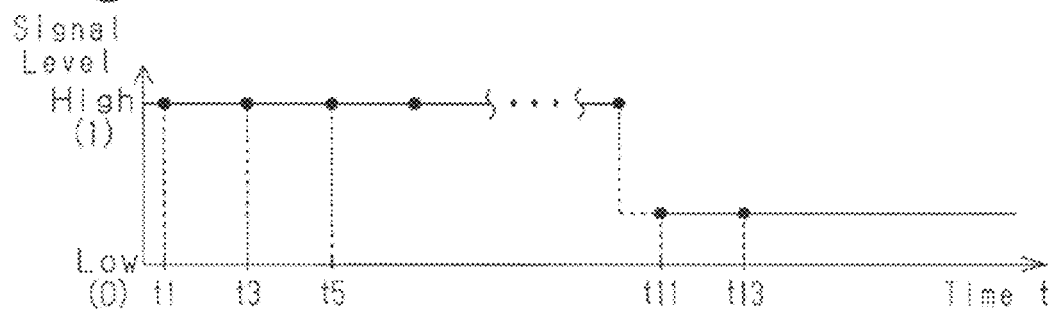
FIG. 7B is a graph showing the signal level of a signal obtained by sampling the fixed value sessions of the detection signal shown in FIG. 7A.
Figure 7C:
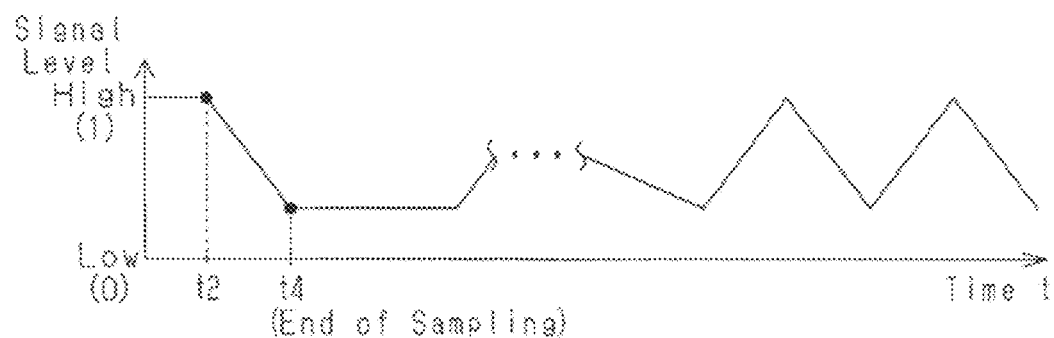
FIG. 7C is a graph showing the signal level of a signal obtained by sampling the non-fixed value sessions of the detection signal shown in FIG. 7A.

As shown in FIG. 7C, the signal level of the signal received and wave-detected by the second antenna 22 is an L level in the measurement performed for the second time (timing t4). Thus, the vehicle control unit 13 determines that the signal level of the signal received and wave-detected by the second antenna 22 is not fixed and the signal level is less than the reception limit Lim. In this case, the vehicle control unit 13 stops sampling the signal at timing tn (n is an even number). In this manner, the vehicle control unit 13 stops sampling early to thereby reduce power consumption required for subsequent measurements. Although the sampling is stopped at timing tn (n is an even number), the sampling is continuously performed at timing tn (n is an odd number), and the switching between the antennas 21 and 22 is also continuously performed.

As shown in FIG. 7B, the signal level of the signal received and wave-detected by the first antenna 21 is an H level in three consecutive measurements performed at timings t1, t3, and t5. In this case, the vehicle control unit 13 determines that the signal level of the signal received and wave-detected by the first antenna 21 is fixed and the reception level of the signal received by the first antenna 21 is greater than or equal to the reception limit Lim. The vehicle control unit 13 thereafter continues to sample the signal level. Subsequently, the signal level is determined as an L level at timings t11 and t13 in the low-level region. The resulting waveform shown in FIG. 7B is the same as the waveform shown in FIG. 6A. The signal level at timing tn (n is an odd number) is measured in the manner described above. This obtains the normal waveform of the detection signal shown in FIG. 6A even when the signal level of the signal received by one antenna is less than the reception limit Lim.

In the angle range D2, the second antenna 22 receives a signal at a reception level greater than or equal to the reception limit Lim, and the first antenna 21 receives a signal at a reception level less than the reception limit Lim. In this case, the signal level is determined as having an H level in three consecutive measurements performed at timing tn (n is an even number). In this case, the sampling of the signal received and wave-detected by the second antenna 22 is performed continuously. At timing tn (n is an odd number), the signal level is determined as an L level in the measurement performed up to three times. In this case, the sampling of the signal received and wave-detected by the first antenna 21 is stopped.

As described above, the receiver of the second embodiment has the same advantages as the advantages of the diversity scheme described above with the conventional technique, without requiring the determination of the antenna in the optimum signal reception condition. When the signal level is determined as an L level in any measurement performed up to three times, the subsequent sampling with the antenna for which the L level has been measured is stopped. This reduces power consumption required for the sampling.

The receiver 11 of the second embodiment has the advantages described below in addition to advantages (1) and (2) of the first embodiment.

(3) The signal level of the detection signal is measured whenever the antennas 21 and 22 are alternately switched so that one of the two antennas 21 and 22 can receive signals. When the signal level measured with one of the antennas 21 and 22 is fixed, the signal received by the antenna is used. When the signal level measured with one of the antennas 21 and 22 is not fixed, the signal received by the antenna includes the non-fixed value sessions T2. The signal reception condition of such an antenna is poor. In this case, the signal received by such an antenna is invalidated. This eliminates the use of the non-fixed value sessions T2.

(4) When the signal level measured by one of the antennas 21 and 22 is not fixed, the subsequent measurement (sampling) with such an antenna is stopped. When the signal level is not fixed, the signal contains the non-fixed value sessions T2, and measurement of the signal level of the non-fixed value sessions T2 would be meaningless. This method reduces power consumption required to measure the signal level of the non-fixed value sessions T2.

Third Embodiment

Figure 8:
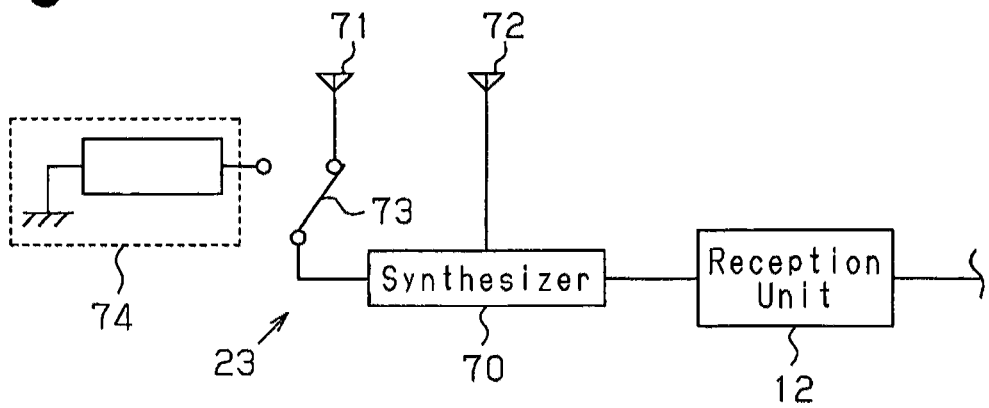
FIG. 8 schematically shows the structure of an antenna unit according to a third embodiment.

A receiver 11 according to a third embodiment used for a vehicle including a TPMS will now be described with reference to FIG. 8. The third embodiment differs from the first and second embodiments in the structure of its antenna unit 23. The receiver of the third embodiment may remove the non-fixed value sessions T2 with the method described in the first embodiment or in the second embodiment. The third embodiment will be described focusing on differences from the first and second embodiments.

The antenna unit 23 of the third embodiment is also a variable directivity antenna unit. As shown in FIG. 8, the antenna unit 23 includes a synthesizer 70 and two antennas 71 and 72 connected to a reception unit 12 via the synthesizer 70. The first antenna 71 has a first directivity, whereas the second antenna 72 has a second directivity. The first directivity and the second directivity may be the same or may differ from each other. A switch 73 is arranged between the first antenna 71 and the synthesizer 70. The switch 73 switches the connection destination of the synthesizer 70 between the first antenna 71 and a dummy load 74. The impedance of the dummy load 74 is set at the same value as that of the first antenna 71.

When the switch 73 is connected to the dummy load 74, only the second antenna 72 receives the air pressure signal. In this case, the antenna unit 23 has the second directivity, which is the directivity of the second antenna 72.

When the switch 73 is connected to the first antenna 71, the first antenna 71 and the second antenna 72 function as a single synthetic antenna that receives the air pressure signal. In this case, the antenna unit 23 (the synthetic antenna) has a third directivity, which is obtained by synthesizing the first directivity and the second directivity based on the principle of the directivity multiplication.

The receiver 11 including the antenna unit 23 according to the third embodiment has the advantages described below in addition to the advantages (1) to (4) described in the first and second embodiments.

(5) The switch 73 connects the first antenna 71 selectively to the synthesizer 70 to switch the directivity of the antenna unit 23 between the second directivity and the third directivity. The receiver of the third embodiment has the same advantages described in the first and second embodiments without requiring the first and second antennas 71 and 72 to be switched.

(6) The antenna unit 23 can receive the air pressure signal via the second antenna 72 when the switch 73 is switching the antenna 71 to a connected state and a disconnected state. This improves the reception performance of the antenna unit 23.

(7) The impedance of the dummy load 74 and the impedance of the first antenna 71 are set at the same value. In this case, the electric state of the synthesizer 70 remains the same even when the switch 73 switches the connection destination of the synthesizer 70 from the first antenna 71 to the dummy load 74. This prevents the directivity of the second antenna 72 as well as the synthesizing ratio of the synthesizer 70 from changing when the switch 73 is switched. As a result, the receiver achieves a desired directivity based on the principle of the directivity multiplication.

Fourth Embodiment

A receiver 11 according to a fourth embodiment used for a vehicle including a TPMS will now be described with reference to FIG. 9. The receiver of the fourth embodiment may remove the non-fixed value sessions with the method described in the first embodiment or in the second embodiment.

The antenna unit 23 of the fourth embodiment is a variable directivity antenna unit and has substantially the same structure as the antenna unit in the third embodiment. The fourth embodiment will be described focusing on its differences from the third embodiment.

Figure 9:
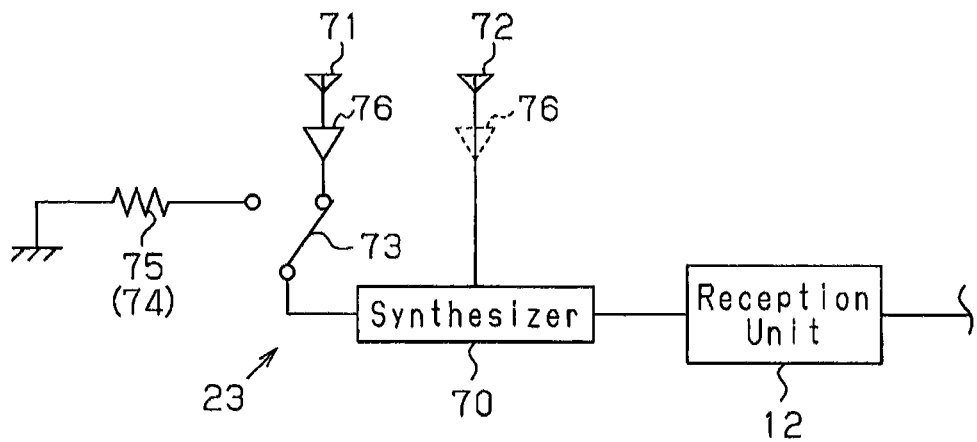
FIG. 9 schematically shows the structure of an antenna unit according to a fourth embodiment.

As shown in FIG. 9, a low noise amplifier (LNA) 76 is arranged between the switch 73 and the first antenna 71. A resistor 75 is arranged to function as the dummy load 74.

The receiver 11 including the antenna unit 23 according to the fourth embodiment has the advantages described below in addition to the advantages described in the third embodiment.

(8) The LNA 76 amplifies the reception signal transmitted from the first antenna 71 while minimizing noise contained in the reception signal. Any signal loss occurring between the first antenna 71 and the reception unit 12 would increase the noise figure (NF) of the receiver 11. The LNA 76 amplifies the reception signal transmitted from the antenna 71 to eliminate the above signal loss that increases the NF. This consequently reduces the NF and improves the reception performance of the receiver 11.

Fifth Embodiment

A receiver 11 according to a fifth embodiment used for a vehicle including a TPMS will now be described with reference to FIG. 10. The fifth embodiment differs from the third embodiment in the structure of its antenna unit 23. The receiver of the fifth embodiment may remove the non-fixed value sessions with the method described in the first embodiment or in the second embodiment.

The antenna unit 23 of the fifth embodiment is also a variable directivity antenna unit. As shown in FIG. 10, the antenna unit 23 includes an antenna 78, which is connected to the reception unit 12, and a metal member 79, which is spaced from the antenna 78. The metal member 79 is a non-power supply element, whereas the antenna 78 is a power supply element. One end of the metal member 79 is connected to ground. A switch 77 (a switch unit) is arranged on the metal member 79.

The switch 77 switches a connection state of the metal member 79 between an open state in which one end of the metal member 79 is open and a grounded state in which one end of the metal member 79 is connected to ground. The wavelength of the air pressure signal is $\lambda$. In this case, the total length of the metal member 79 including the switch 77 is $\lambda/2$ in the grounded state. On the other hand, the total length of the metal member 79 is smaller than $\lambda/2$ in the open state.

In the grounded state, the metal member 79 receives an electromagnetic wave (the air pressure signal) and resonates with the electromagnetic wave to induce a current. With the current, the metal member 79 re-emits an electromagnetic wave. The metal member 79 functions as a reflection element or a waveguide element. The reflection element strengthens the directivity of the antenna 78 in a direction opposite to the direction from the antenna 78 toward the reflection element. The waveguide element strengthens the directivity of the antenna 78 in a direction from the antenna 78 toward the waveguide element.

In the open state, the total length of the metal member 79 is not $\lambda/2$. In this state, the metal member 79 does not resonate an the electromagnetic wave. The metal member 79 receives an electromagnetic wave (the air pressure signal) and induces practically no current. In the open state, the metal member 79 does not re-emit an electromagnetic wave that would affect the antenna 78. The total length of the metal member 79 including the switch 77 is $\lambda/2$ in the present example. The total length of the metal member 79 may not be $\lambda/2$ for a different condition under which the metal plate resonates to induce a current.

The directivity of the antenna 78 changes depending on whether an electromagnetic wave emitted from the metal member 79 affects the antenna 78. When, for example, the metal member 79 functions as the reflection element, the antenna 78 has a stronger directivity at its side opposite to the metal member 79.

The receiver 11 including the antenna unit 23 according to the fifth embodiment has the advantages described below in addition to the advantages described in the third embodiment.

(9) The simple structure in which the metal member 79 is arranged near the antenna 78 easily switches the directivity of the antenna 78.

Sixth Embodiment

A receiver 11 according to a sixth embodiment used for a vehicle including a TPMS will now be described with reference to FIG. 11. The sixth embodiment differs from the third embodiment in the structure of its antenna unit 23. The receiver of the sixth embodiment may remove the non-fixed value sessions with the method described in the first embodiment or in the second embodiment.

The antenna unit 23 of the sixth embodiment is also a variable directivity antenna unit. As shown in FIG. 11, the antenna unit 23 includes a linear antenna 82. The antenna 82 includes a first terminal connected to the reception unit 12 and a second terminal connected to ground. The second terminal of the antenna 82 is connected to ground via a switch 84 and a capacitor 83. When the switch 84 is on, the antenna 82 is connected to ground via the switch 84 and the capacitor 83 and functions as a grounded antenna. In this state, the capacitor 83 adjusts the electrical length of the antenna 82. In the present example, the antenna 82 is an example of a power supply element. The switch 84 is an example of a switch unit.

When the switch 84 is off, the second terminal of the antenna 82 is open, and the antenna 82 functions as a non-grounded antenna.

The receiver 11 including the antenna unit 23 according to the sixth embodiment has the advantages described below in addition to the advantage (6) described in the third embodiment.

(10) The switch 84 is switched on and off to change the state, physical length, and electrical length of the antenna 82. This structure easily changes the directivity of the antenna 82.

Seventh Embodiment

Figure 12:
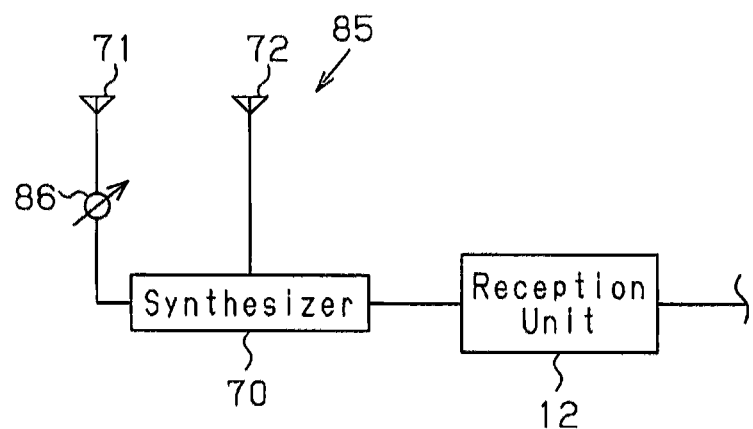
FIG. 12 schematically shows the structure of an antenna unit according to a seventh embodiment.

A receiver 11 according to a seventh embodiment used for a vehicle including a TPMS will now be described with reference to FIG. 12. In the seventh embodiment, an antenna unit 85 is arranged in place of the antenna unit 23 of the third embodiment. The receiver 11 of the seventh embodiment may remove the non-fixed value sessions with the method described in the first embodiment or in the second embodiment.

The antenna unit 85 of the seventh embodiment is also a variable directivity antenna unit. As shown in FIG. 12, the antenna unit 85 is a phased array antenna. The antenna unit 85 has the same structure as shown in FIG. 8 and includes a first antenna 71, a second antenna 72, and a synthesizer 70. A phase shifter 86 is arranged between the first antenna 71 and the synthesizer 70. The phase shifter 86 changes the phase of the reception signal transmitted from the first antenna 71. This changes a phase difference between the reception signal from the first antenna 71 and the reception signal from the second antenna 72 at the input of the synthesizer 70. A change in the phase difference changes the directivity of the synthetic antenna (the antenna unit 85), which includes the first and second antennas 71 and 72. The directivity of the synthetic antenna is determined by the positions of the two antennas 71 and 72 and the directivities of the antennas 71 and 72. Each of the antennas 71 and 72 is an example of a power supply element. The phase shifter 86 is an example of a switch unit.

The receiver 11 including the phased array antenna (antenna unit 85) according to the seventh embodiment has the advantages described below in addition to the advantages (5) and (6) described in the third embodiment.

(11) The phased array antenna (antenna unit 85) achieves a plurality of directivities.

Eighth Embodiment

Figure 13:
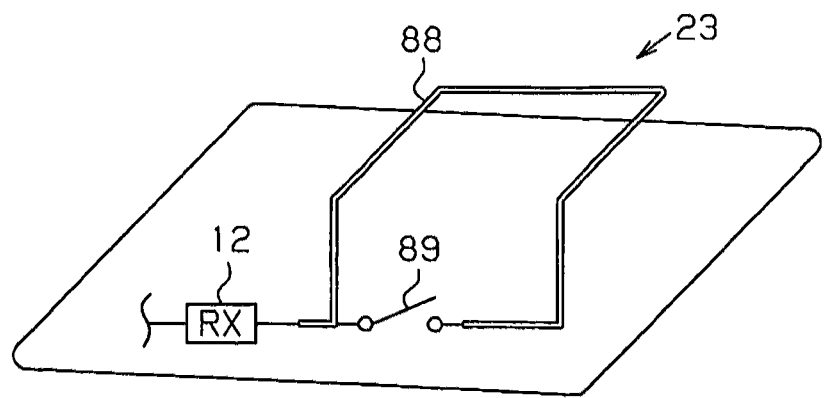
FIG. 13 schematically shows the structure of an antenna unit according to an eighth embodiment.

A receiver 11 according to an eighth embodiment used for a vehicle including a TPMS will now be described with reference to FIG. 13. The eighth embodiment differs from the third embodiment in the structure of the antenna unit 23. The receiver 11 of the eighth embodiment may remove the non-fixed value sessions with the method described in the first embodiment or in the second embodiment.

The antenna unit 23 of the eighth embodiment is also a variable directivity antenna unit. As shown in FIG. 13, the antenna unit 23 includes an antenna 88 (power supply element), which is substantially looped and includes spaced parts. A switch 89 (a switch unit) is arranged between the spaced parts of the antenna 88. When the switch 89 is off, the antenna 88 opens and functions as a non-grounded antenna. When the switch 89 is on, the antenna 88 functions as a loop antenna.

The antenna 88 is only required to be partially looped and does not have to be a complete circular loop. In the example shown in FIG. 13, a spread-out view shows the antenna 88 being O-shaped when the switch 89 is on. Alternatively, a spread-out view may show the antenna 88 being P-shaped or R-shaped.

The receiver 11 including the antenna unit 23 according to the eighth embodiment has the advantages described below.

(12) The switch 89 is switched on and off to change the properties of the antenna 88, or more specifically, to change the distribution of the current induced by the antenna 88 receiving the air pressure signal (an electromagnetic wave). This structure easily changes the directivity of the antenna 88. Further, the single antenna 88 is used to change the directivity in the eighth embodiment. This eliminates a period during which the air pressure signal cannot be received when the switch 89 is switched on and off. Thus, the reception performance of the receiver 11 is improved.

Ninth Embodiment

A receiver 11 according to a ninth embodiment used for a vehicle including a TPMS will now be described with reference to FIG. 14. The ninth embodiment differs from the fifth embodiment in that the receiver 11 additionally includes a matching circuit for matching impedance. The receiver 11 of the ninth embodiment may remove the non-fixed value sessions with the method described in the first embodiment or in the second embodiment.

Figure 10:
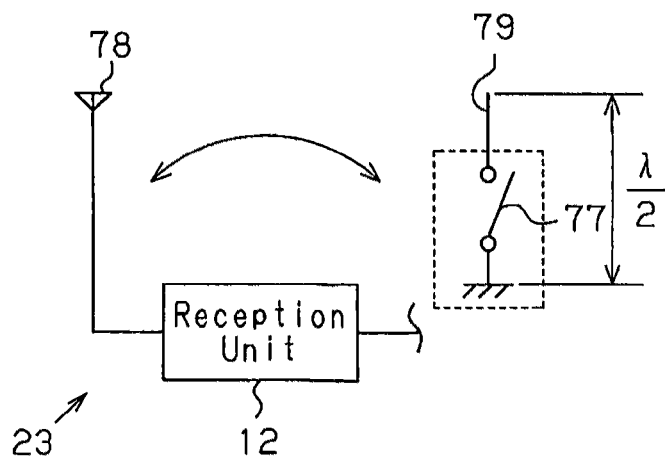
FIG. 10 schematically shows the structure of an antenna unit according to a fifth embodiment.
Figure 14:
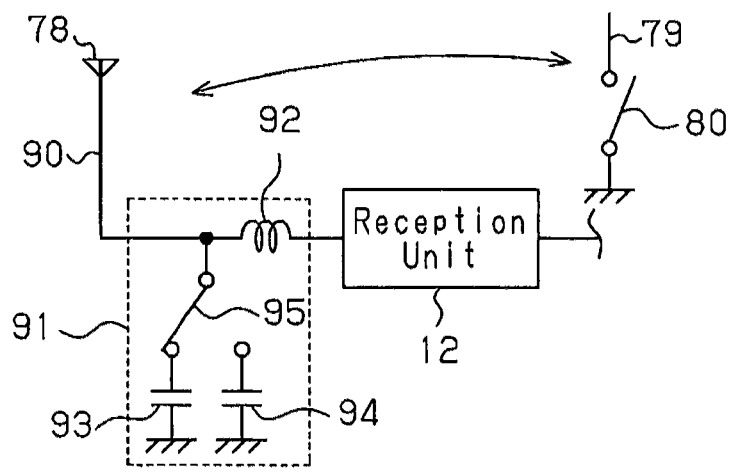
FIG. 14 schematically shows the structure of an antenna unit according to a ninth embodiment.

As shown in FIG. 14, the antenna unit of the ninth embodiment includes an antenna 78 and a metal member 79 in the same manner as in the fifth embodiment shown in FIG. 10. The antenna unit of the ninth embodiment is also a variable directivity antenna unit. The antenna 78 is connected to a reception unit 12 via a transmission path 90. A matching circuit 91, which matches the impedance between the antenna 78 and the transmission path 90, is arranged on the transmission path 90. The matching circuit 91 includes a coil 92 and first and second capacitors 93 and 94.

The coil 92 is arranged on the transmission path 90. A switch 95 (switch unit) is arranged between the coil 92 and the antenna 78 on the transmission path 90. One terminal of each of the capacitors 93 and 94 is connected to ground. The switch 95 connects the transmission path 90 selectively to one of the capacitors 93 and 94.

A switch 80, which is arranged on the metal member 79, is switched on and off to change the impedance of the antenna 78. The impedance of the matching circuit 91 changes in accordance with changes in the impedance of the antenna 78. More specifically, when the switch 80 connected to the metal member 79 is switched on, the switch 95 connected to the antenna 78 connects the transmission path 90 to the first capacitor 93. When the switch 80 connected to the metal member 79 is switched off, the switch 95 connected to the antenna 78 connects the transmission path 90 to the second capacitor 94. The capacitors 93 and 94 are set to have different capacitance values.

The ninth embodiment has the advantages described below.

(13) The switch 95 is switched in accordance with a change in the impedance of the antenna 78. As a result, the impedance of the matching circuit 91 changes accordingly. This structure maintains the matching impedance when the switch 95 connected to the metal member 79 is switched and reduces power loss that would be caused by reflection.

It should be apparent to those skilled in the art that the present invention may be embodied in many other specific forms without departing from the spirit or scope of the invention. Particularly, it should be understood that the present invention may be embodied in the following forms.

In the second embodiment, when each of the antennas 21 and 22 receives a signal having a signal level greater than or equal to the reception limit Lim, the sampling using both the antennas 21 and 22 is continued. However, the sampling using one of the antennas 21 and 22 may be stopped. This method further reduces power consumption required for the sampling.

In the second embodiment, the receiver 11 includes the two antennas 21 and 22. Alternatively, the receiver 11 may include three or more antennas. When the receiver includes three or more antennas, the fixed value sessions T1 may be short relative to the non-fixed value sessions T2 depending on the signal reception condition. When, for example, one of the three antennas is receiving a signal at a signal level greater than or equal to the reception limit Lim, the ratio of the non-fixed value sessions T2 and the fixed value sessions T1 will be 2:1. When the non-fixed value sessions T2 are long, the signal level of the detection signal including the recessed or protruded parts in the non-fixed value sessions T2 after the detection signal passes through the low-pass filter 45 may exceed the threshold Vr as described with reference to FIG. 6C in the first embodiment. However, the receiver of the second embodiment does not use the low-pass filter 45, and thus does not have this problem. The sampling of the signal level of the signal received and wave-detected by each antenna simply allows the waveform of the signal level corresponding to each antenna to be recognized as shown in FIGS. 7B and 7C. In this manner, an increase in the number of antennas increases the likelihood of the air pressure signal being receivable.

In the second embodiment, when the signal level is determined as an H level in the initial three measurements, the receiver determines that the antenna is receiving a signal at a signal level greater than or equal to the reception limit Lim. This determination is performed because the initial part of the air pressure signal is set at an H level. Alternatively, the initial part of the air pressure signal may be set at an L level. In this case, the apparatus determines that the antenna is receiving a signal at a signal level greater than or equal to the reception limit Lim when the signal level is determined as an L level in the initial three measurements.

In the second embodiment, the signal sampling is stopped when the signal level is determined as an L level in any measurement performed up to three times, but the switching between the antennas 21 and 22 is continued. Alternatively, the switching of the antennas 21 and 22 may be stopped when the signal level is determined as an L level, and only the antenna that is capable of receiving a signal at a reception level greater than or equal to the reception limit Lim may be used thereafter. This eliminates the subsequent control associated with the switching of the antennas 21 and 22, and also eliminates power required for such control.

In the second embodiment, the determination as to whether the subsequent sampling is to be continued is performed based on the signal level determined in the measurement performed up to three times. The number of times the measurement is performed should not be limited to three times. An increase in the number of times the measurement is performed will increase the reliability of the determination as to whether the antennas 21 and 22 receive a signal at a signal level greater than or equal to the reception limit Lim. Decreasing the number of times the measurement is performed will increase the speed at which the determination is performed as to whether the antennas 21 and 22 receive a signal at a reception level greater than or equal to the reception limit Lim.

In the second embodiment, the signal level is measured only once in each period corresponding to the fixed value session T1 and to the non-fixed value session T2. Alternatively, the signal level of the detection signal may be measured a plurality of times in each period corresponding to the fixed value session T1 and to the non-fixed value session T2. This structure measures the signal level of the detection signal a plurality of times whenever the antennas 21 and 22 are switched (or whenever the directivity of the variable directivity antenna is switched). Increasing the number of times the measurement is performed will increase the reliability of the determination as to whether the signal level is fixed.

In the first to ninth embodiments, the receiver uses FSK as the modulation method. Alternatively, the receiver may use phase shift keying (PSK) as the modulation method. With PSK, information indicating 1 (H level) or 0 (L level) is allocated to the change of the phase of a wireless signal. When the receiver of the first embodiment uses PSK, the antennas 21 and 22 are switched in the same manner as with FSK. In this case, the phase will remain unchanged when the signal level changes. The change in the signal level will not affect wave-detection of the signal having a level greater than or equal to the reception limit Lim, at which the signal can be received and wave-detected.

In the first to ninth embodiments, the receiver 11 is used in a TPMS for a vehicle. Alternatively, the receiver 11 may be used for other mobile communications.

In the third embodiment, the switch 73 is arranged only between the first antenna 71 and the synthesizer 70. However, a switch may be newly arranged between the second antenna 72 and the synthesizer 70. In the same manner as the switch 73, the new switch switches the connection destination of the synthesizer 70 between the dummy load and the second antenna 72.

In the third embodiment, the number of antennas should not be limited to two. The antenna unit may include three or more antennas.

In the fourth embodiment, an LNA 76 may be arranged between the second antenna 72 and the synthesizer 70 as indicated by a broken line in FIG. 9. This arrangement further reduces the noise figure (NA).

In the fifth embodiment, the switch 77 switches whether or not the metal member 79 is to resonate with the signal. Alternatively, when the switch 77 can change the directivity of the antenna 78, the switch 77 does not have to switch whether or not the metal member 79 is to resonate. More specifically, the switch 77 may change the total length of the metal member 79 to change the distribution of the current inducted by the metal member 79. This consequently changes the electromagnetic wave from the metal member 79, and thus changes the directivity of the antenna 78.

In the fifth embodiment, the directivity may be changed by switching the function of the metal member 79 between the reflection element and the waveguide element using the switch 77.

In the fifth embodiment, the metal member 79 is connected directly to ground via the switch 77. However, a coil and/or a capacitor may be arranged between the switch 77 and the ground. This structure eliminates the need for changing the length of the metal member 79 and allows the electrical length of the metal member 79 to be adjusted. Adjusting the electrical length of the metal member 79 changes the electromagnetic wave emitted from the metal member 79. The capacitor may be a variable capacitor, and the coil may be a variable coil.

Figures 16A, 16B:
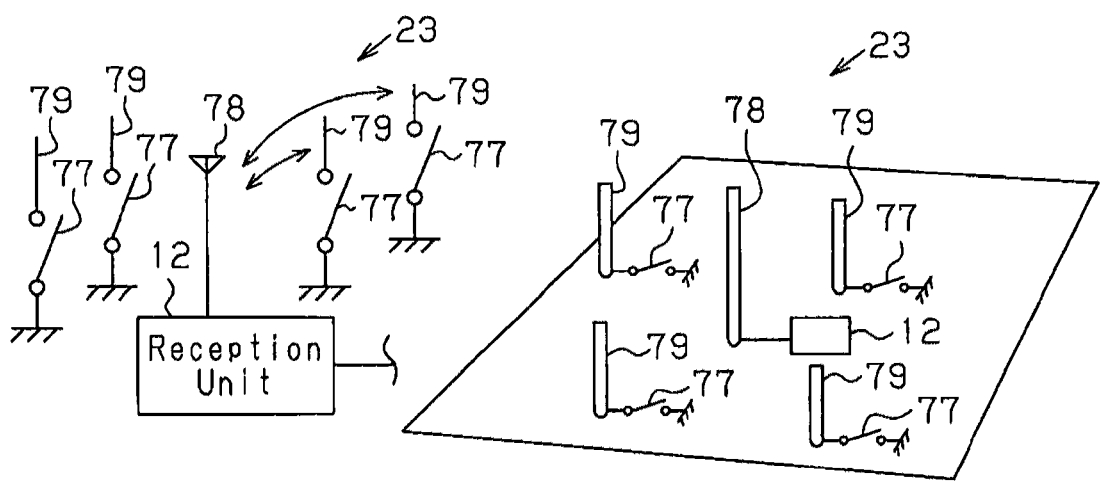
FIG. 16A schematically shows the structure of an antenna unit according to still another embodiment.
FIG. 16B is a perspective view schematically showing the antenna unit shown in FIG. 16A.

In the fifth embodiment, a plurality of metal members 79 may be arranged on the antenna unit 23. In FIGS. 16A and 16B, for example, four metal members 79 are arranged to surround an antenna 78. Each metal member 79 includes a switch 77. The four switches 77 may be switched on and off simultaneously, or each switch 77 may be switched on and off independently of each other. Alternatively, the four metal members 79 may be divided into groups, and the different groups of switches 77 may be switched independently of each other. This increases the variety of directivities of the antenna 78.

In the sixth embodiment, the antenna 82 is connected to ground via the capacitor 83. However, the structure of the sixth embodiment may not use the capacitor 83 when the switch 84 can change the physical or electrical length of the antenna 82. For example, a metal member or a coil may be arranged in place of the capacitor 83, or the capacitor 83 may be eliminated. Further, a coil may be connected in series in addition to the capacitor 83. The capacitor may be a variable capacitor, and the coil may be a variable coil. One end of the antenna 82 may not be connected to ground.

Figure 11:
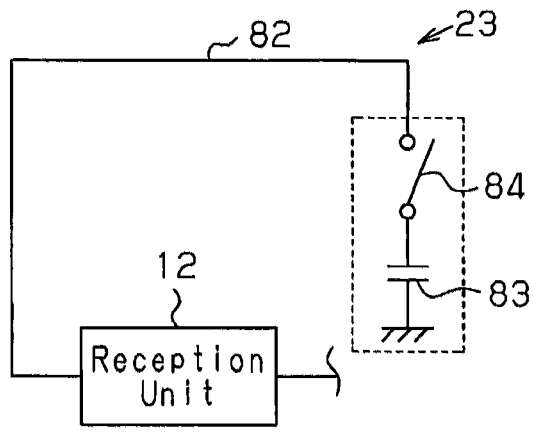
FIG. 11 schematically shows the structure of an antenna unit according to a sixth embodiment.
Figures 17A, 17B:
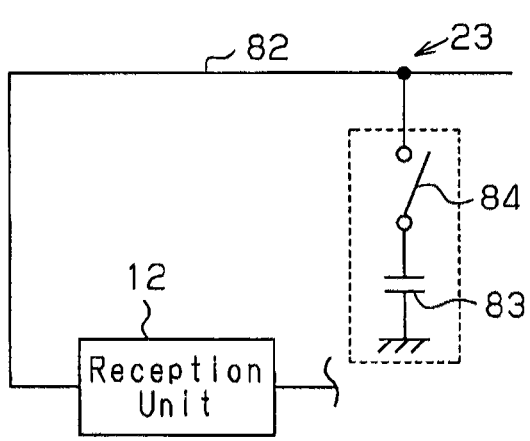
FIG. 17A schematically shows the structure of an antenna unit according to a modified embodiment.
FIG. 17B is a perspective view schematically showing the antenna unit shown in FIG. 17A.

The antenna 82 in the sixth embodiment is not limited to the antenna having the shape shown in FIG. 11. For example, an end of the antenna 82 extending in the direction opposite to the reception unit 12 may branch into a first line and a second line as shown in FIGS. 17A and 17B. In this case, the first line may be connected to ground via the switch 84 and the capacitor 83, whereas the second line may be open. This structure also changes the directivity of the antenna 82 by switching the switch 84 on and off.

In the eighth embodiment, a coil or a capacitor may be arranged between the switch 89 and one end of the antenna 88 to adjust the electric length of the antenna 88.

The matching circuit 91 (FIG. 14) in the ninth embodiment can also be used in the structures shown in FIGS. 8 to 13 and FIGS. 15 to 17A and 17B.

Figure 15:
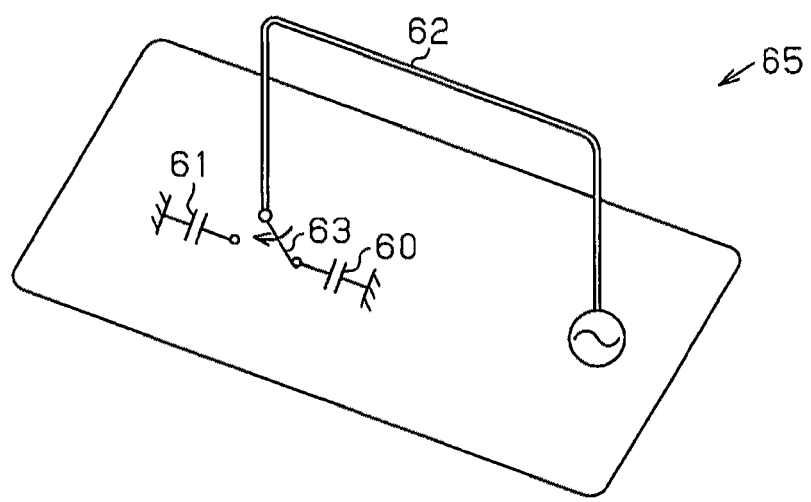
FIG. 15 is a perspective view showing a schematic structure of an antenna unit according to another embodiment.

In the first to fourth embodiments and in the seventh embodiment, the receiver 11 includes the antenna unit 23 including two antennas. The antenna unit 23 does not have to include a plurality of antennas and may include only a single antenna that can switch the directivity. For example, FIG. 15 shows a variable directivity antenna unit 65 including only a single antenna 62. As shown in FIG. 15, the variable directivity antenna unit 65 includes two capacitors 60 and 61 each having a different capacitance value. Each of the capacitors 60 and 61 has a first terminal connected to an antenna 62 via a switching element 63 (a switch unit) and a second terminal connected to ground. The switching element 63 selectively connects one of the capacitors 60 and 61 to the antenna 62 to change the directivity of the antenna 62. In other words, the single antenna 62 can change the directivity. In this case, the antenna unit 65 achieves the same function as the antenna unit 23 including the pair of antennas. The structure shown in FIG. 15 switches the directivity of the antenna 62 at a high speed in the same manner as the structure that switches the pair of antennas at a high speed.

In the first to ninth embodiments, the receiver 11 does not determine the strength of the radio wave of the transmission signal for each antenna or each directivity. The receiver 11 may determine the signal strength for each antenna or for each directivity. Based on the determination result of the signal strength, the antenna that has received the stronger radio wave or the directivity through which the stronger radio wave has been received may be used to receive the transmission signal. For example, the antennas or the directivities may be switched at a high speed in the same manner as in the above embodiments in a predetermined period corresponding to the first several bits to several tens of bits of the transmission signal. The vehicle control unit 13 (or the receiver 11 having the same function) determines the strength of the radio wave received via each antenna or via each directivity. The vehicle control unit 13 then selects the antenna or the directivity via which the stronger radio wave has been received when the predetermined period elapses. The vehicle control unit 13 thereafter receives a transmission signal only via the selected antenna or the selected directivity. This method is preferable for the structure in which a plurality of frames are transmitted at a time from an electronic key, such as a wireless key system. In the structure in which a plurality of frames are transmitted, the antennas or the directivities are switched at a high speed in the manner described above at reception of a predetermined one of the frames. The antenna or the directivity via which the stronger radio wave has been received is selected. The subsequent frames are then received via the selected antenna or the selected directivity, or in other words via the antenna in the optimum reception environment.

The present examples and embodiments are to be considered as illustrative and not restrictive, and the invention is not to be limited to the details given herein, but may be modified within the scope and equivalence of the appended claims.

The invention claimed is:

1. A receiver comprising:
   an antenna unit that is able to receive a transmission signal transmitted from a communication subject alternately at a plurality of different reception levels;
   a wave detection unit that wave-detects the transmission signal received by the antenna unit to generate a detection signal, wherein
      the detection signal has a signal level that becomes a fixed value in accordance with the transmission signal when the antenna unit receives the transmission signal at a reception level that is greater than or equal to a reception limit threshold at which the transmission signal can be normally received, and
      the detection signal has a signal level that becomes a non-fixed value when the antenna unit receives the transmission signal at a reception level that is less than the reception limit threshold; and
   a correction unit that, when the detection signal includes a fixed value session and a non-fixed value session, changes a signal level of the non-fixed value session to a level equivalent to a signal level of the fixed value session adjacent in time to the non-fixed value session, wherein the fixed value session is defined by a duration of the fixed value of the detection signal and the non-fixed value session is defined by a duration of the non-fixed value of the detection signal.

2. The receiver according to claim 1, wherein the antenna unit is a variable directivity antenna unit that selectively uses one of a plurality of directivities.

3. The receiver according to claim 2, wherein the variable directivity antenna unit switches the plurality of directivities at a time interval that is shorter than a time required to receive a bit unit of the transmission signal, and the correction unit includes a low-pass filter that removes a high-frequency element from the detection signal, and when the variable directivity antenna unit receives the transmission signal at a reception level that is greater than or equal to the reception limit threshold with a first directivity among the plurality of directivities and receives the transmission signal at a reception signal that is less than the reception limit threshold with a second directivity among the plurality of directivities, the low-pass filter removes from the detection signal obtained with the second directivity a high-frequency element as the non-fixed value session.

4. The receiver according to claim 3, further comprising a comparator that receives the detection signal from the wave detection unit via the low-pass filter, compares the signal level of the detection signal via the low-pass filter with a threshold, and binarizes the detection signal.

5. The receiver according to claim 2, wherein the variable directivity antenna unit switches the plurality of directivities at a time interval that is shorter than the time required to receive a bit unit of the transmission signal, the correction unit measures a signal level of the detection signal whenever the plurality of directivities are switched and determines, for each directivity, whether or not the signal level of the detection signal is fixed, when the signal level of the detection signal obtained with a first directivity among the plurality of directivities is fixed, the correction unit accepts the detection signal obtained with the first directivity, and when the signal level of the detection signal obtained with a second directivity among the plurality of directivities is not fixed, the correction unit invalidates the detection signal obtained with the second directivity to remove the non-fixed value session.

6. The receiver according to claim 5, wherein when the signal level of the detection signal obtained with the second directivity is not fixed, the correction unit stops measuring the signal level of the detection signal obtained with the second directivity.

7. The receiver according to claim 5, wherein the correction unit measures the signal level of the detection signal a number of times whenever the plurality of directivities are switched.

8. The receiver according to claim 2, wherein the variable directivity antenna unit includes:
a power supply element that receives the transmission signal; and
a switch unit that is arranged on the power supply element and changes an electrical length of the power supply element.

9. The receiver according to claim 2, wherein the variable directivity antenna unit includes:
a plurality of antennas;
a synthesizer that synthesizes directivities of the antennas; and
a switch that selectively connects at least one of the antennas to the synthesizer, wherein the switch switches the at least one of antennas between a state in which the transmission signal is receivable and a state in which the transmission signal is non-receivable.

10. The receiver according to claim 2, wherein the variable directivity antenna unit includes:
a power supply element that receives the transmission signal;
a non-power supply element functioning as a reflection element, which strengthens directivity of the power supply element in a direction opposite to a direction oriented from the power supply element toward the non-power supply element, and a waveguide element, which strengthens directivity of the power supply element in a direction oriented from the power supply element toward the non-power supply element; and
a switch unit that changes an electrical length of the non-power supply element.

11. The receiver according to claim 2, wherein the variable directivity antenna unit includes a switch unit that changes distribution of a current induced by the variable directivity antenna unit when receiving the transmission signal.

12. The receiver according to claim 1, wherein the antenna unit includes a plurality of antennas that are positionally spaced from one another, and the antenna unit switches the antennas so that one of the antennas is selectively set in a state in which the transmission signal is receivable.

13. The receiver according to claim 12, wherein
the plurality of antennas include a first antenna and a second antenna,
the correction unit includes a low-pass filter that removes a high-frequency element from the detection signal, and
the low-pass filter removes from the detection signal obtained with the second antenna a high-frequency element as the non-fixed value session when the first antenna receives the transmission signal at a reception level greater that is greater than or equal to the reception limit threshold and the second antenna receives the transmission signal at a reception level that is less than the reception limit threshold.

14. The receiver according to claim 13, further comprising a comparator that receives the detection signal from the wave detection unit via the low-pass filter, compares the signal level of the detection signal via the low-pass filter with a threshold, and binarizes the detection signal.

15. The receiver according to claim 12, wherein
the antenna unit switches the antennas at a time interval that is shorter than the time required to receive a bit unit of the transmission signal,
the correction unit measures a signal level of the detection signal whenever the antennas are switched and determines, for each antenna, whether or not the signal level of the detection signal is fixed,
when the signal level of the detection signal obtained with a first antenna among the antennas is fixed, the correction unit accepts the detection signal obtained with the first antenna, and
when the signal level of the detection signal obtained with a second antenna among the antennas is not fixed, the correction unit invalidates the detection signal obtained with the second antenna to remove the non-fixed value session.

16. The receiver according to claim 15, wherein when the signal level of the detection signal obtained with the second antenna is not fixed, the correction unit stops measuring the signal level of the detection signal obtained with the second antenna.

17. The receiver according to claim 15, wherein the correction unit measures the signal level of the detection signal a number of times whenever the plurality of antennas are switched.

* * * * *

UNITED STATES PATENT AND TRADEMARK OFFICE
CERTIFICATE OF CORRECTION

PATENT NO. : 8,818,320 B2
APPLICATION NO. : 13/373888
DATED : August 26, 2014
INVENTOR(S) : Masanori Kosugi It is certified that error appears in the above-identified patent and that said Letters Patent is hereby corrected as shown below:

Title page, Column 1, item (30):
Delete "December 24, 2009 (JP) 2009-292238".

Signed and Sealed this
Tenth Day of February, 2015

Michelle K. Lee
*Deputy Director of the United States Patent and Trademark Office*